United States Patent
Sun

(10) Patent No.: US 6,457,562 B1
(45) Date of Patent: Oct. 1, 2002

(54) LOWER BEARING MOUNT FOR SEALED COMPRESSOR

(75) Inventor: Zili Sun, Arkadelphia, AR (US)

(73) Assignee: Scroll Technologies, Arkadelphia, AR (US)

( * ) Notice: Subject to any disclaimer, the term of this patent is extended or adjusted under 35 U.S.C. 154(b) by 17 days.

(21) Appl. No.: 09/771,420

(22) Filed: Jan. 26, 2001

(51) Int. Cl.$^7$ ................................................. F01M 1/00
(52) U.S. Cl. ...................... 184/6.16; 184/6.25; 418/55.6
(58) Field of Search ............................. 184/6.16, 6.24, 184/6.25; 418/55.6, 94

(56) References Cited

U.S. PATENT DOCUMENTS 6,039,550 A * 3/2000 Friedley et al. ............ 418/55.6
6,039,551 A * 3/2000 Takeuchi et al. .............. 418/88
6,116,877 A * 9/2000 Takeuchi et al. .............. 418/88

* cited by examiner

Primary Examiner—David Fenstermacher
(74) Attorney, Agent, or Firm—Carlson, Gaskey & Olds

(57) ABSTRACT

An improved bearing for a sealed compressor incorporates a bearing mount mounted radially outwardly of the bearing. Oil supply passages extend through the bearing mount to supply lubricant to the bearing. A magnet is positioned outwardly of the bearing mount, and will collect magnetic debris within the lubricant. The positioning of the magnet adjacent to the oil supply passages provides adequate removal of the debris in an efficient way.

8 Claims, 2 Drawing Sheets

LOWER BEARING MOUNT FOR SEALED COMPRESSOR

BACKGROUND OF THE INVENTION

This invention relates to a lower bearing for supporting an end of a driveshaft for a compressor, wherein oil flow holes leading through the bearing are positioned adjacent to a magnet mount.

Compressors are utilized to compress a refrigerant in refrigerant cycle applications. Typically, these compressors are mounted within a sealed housing. An oil supply is also included within the housing, to lubricate the rotating shafts, etc.

A shaft is typically driven by a motor, and then drives a compressor pump unit to compress the refrigerant. The typical shaft mount as has been utilized in the past has a bearing mount extending radially inwardly from a central housing. The shaft is mounted within that bearing mount. More recently it has been proposed to mount the bearing on an end cap of the housing. Passages to supply oil upwardly to the shaft and to the compressor pump unit are typically formed through the type of bearing mount mounted on the end cap.

It has also been proposed in the standard type of compressor bearing mount to provide a magnet at a predictable location on the end cap such that the magnet will attract metal debris from the lubricant, prior to it reaching the compressor pump unit, or other moving surfaces in the compressor. Often there are loose metallic debris pieces in the housing. The pieces may be formed by the welding operation to initially seal the compressor, or may be formed with wear. The magnet's purpose is to remove those pieces from the lubricant. Typically, a magnet has been positioned at a non-set location, such as by simply dropping it onto the end cap. However, it has been recently proposed to mount the magnet at a location on to structure from the end cap.

SUMMARY OF THE INVENTION

In the disclosed embodiment of this invention, a bearing for an end of a sealed compressor shaft is secured to an end cap of the sealed compressor. Oil flow holes for supplying oil into the bearing extend through the bearing mount. A magnet is mounted outwardly of the bearing mount. Thus, the bearing mount supplies the structure for holding the magnet at a preset position. Preferably, the oil flow holes are positioned to be immediately above the magnet such that the magnet will be in the best position to remove the great majority of the metallic debris from the oil flowing into the holes.

Also, the mount is preferably welded to the end cap at a location inwardly of the magnet. Thus, the magnet will block the weld splatter from even reaching the lubricant.

These and other features of the present invention can be best understood from the following specification and drawing.

DETAILED DESCRIPTION OF A PREFERRED EMBODIMENT

Figure 1A:
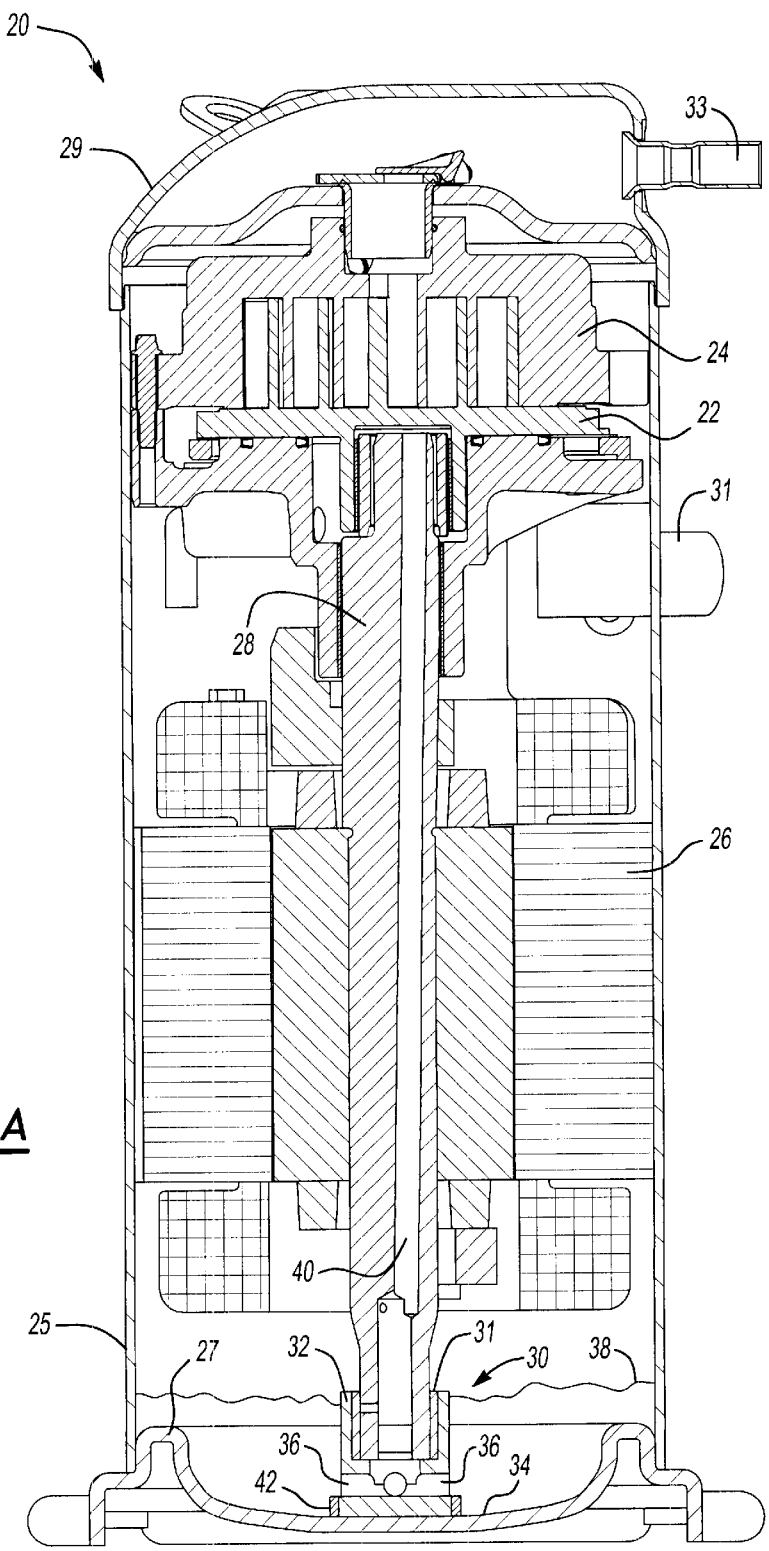
FIG. 1A is a cross-sectional view through an inventive bearing and compressor arrangement.

An improved compressor 20 is illustrated in FIG. 1 having a non-orbiting scroll 22 associated with an orbiting scroll 24. While the application is shown in a scroll compressor, it should be understood that the invention has application in other types of sealed compressors. As is known, a sealed compressor typically includes a central shell 25 with end caps 27 and 29 at each end. The end caps and the central shell together form a sealed housing. A suction inlet 31 supplies suction refrigerant into the housing, where it can circulate over the motor 26. The discharge refrigerant leaves through a tube 33 adjacent to the opposed end of the compressor. As is shown, the compressor motor 26 drives a driveshaft 28. An end of the driveshaft 28 is secured within a bearing arrangement 30 mounted at an opposed end of the motor 26 from the compressor pump unit. A bearing 31 is mounted within a bearing mount 32. The bearing mount 32 is secured to the end cap 27, such as by welding at 34. Oil supply ports 36 extend radially inwardly through the bearing mount 32 and communicate a supply of lubricant 38 through a tube passage 40 within the shaft 28. As the shaft 28 rotates, oil is drawn upwardly through the passages 40, and is delivered to the compressor pump unit 22 and 24.

The bearing oil supply passages 36 is positioned immediately adjacent a magnet 42. Preferably magnet 42 is generally cylindrical and surrounds a lower portion of the bearing mount 30. Now, the magnet 42 is positioned to be immediately adjacent the oil supply passage 36, such that metallic debris will be removed from the lubricant being supplied to the compressor pump unit.

Figure 1B:
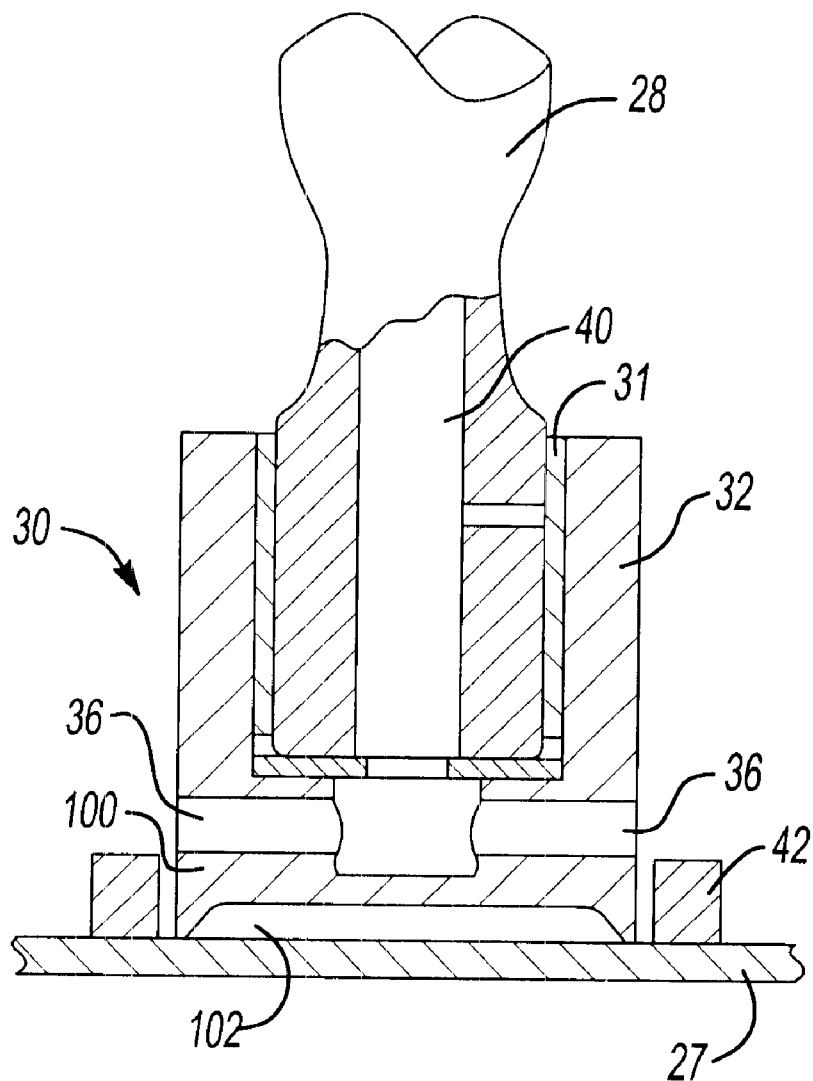
FIG. 1B shows an enlarged view of the bearing mount prior to welding.

Further, as shown in FIG. 1B, the bearing initially has a structure 100 which provides a sacrificial structure for forming a weld joint. As can be seen in FIG. 1B, a chamber 102 is formed radially inwardly of the weld joint structure 100. The welding is achieved prior to placement of the magnet, but the weld splatter will tend to be formed at the weld joint. The weld splatter radially inward of structure 100 will be sealed inside chamber 102. Then, when the magnet 42 is placed outwardly of the bearing mount, the bulk of the weld splatter outside of chamber 102 will be radially inward of the magnet, and thus quite unlikely to reach any of the lubricant passages. However, as mentioned above, the magnet being located adjacent to the passage will further ensure that no metallic debris reaches the passage 40 within the shaft 28.

Although a preferred embodiment of this invention has been disclosed, a worker in this art would recognize that certain modifications would come within the scope of this invention. For that reason the following claims should be studied to determine the true scope and content of this invention.

What is claimed is:

1. A compressor comprising:

a sealed housing incorporating a central shell and an end cap at one end of said shell;

an electric motor driving a shaft, said shaft in turn driving a compressor pump unit;

a remote end of said shaft extending through said motor to an end opposed to said compressor pump unit, said remote end of said shaft being secured in a bearing assembly, said bearing assembly being secured to said end cap of said housing; and said bearing assembly including oil supply passages for supplying a lubricant to a passage within said shaft, and a magnet mounted outwardly of said bearing assembly and adjacent to said oil supply passages.

2. A compressor as recited in claim 1, wherein said oil supply passages extend through said bearing assembly at a first vertical location, and said magnet is mounted beneath said first vertical location and surrounding said bearing assembly.

3. A compressor as recited in claim 1, wherein said bearing assembly includes a bearing mount and a bearing formed as separate components.

4. A compressor as recited in claim 1, wherein said oil supply passages extend radially inwardly from circumferentially spaced locations.

5. A compressor as recited in claim 1, wherein said first bearing is welded to said end cap.

6. A compressor as recited in claim 1, wherein a bearing assembly includes a sacrificial weld structure at a radially outer location for welding said bearing assembly to said end cap.

7. A compressor as recited in claim 1, wherein said bearing is welded to said end cap and at a location radially inwardly of said magnet.

8. A compressor comprising:

a sealed housing incorporating a central shell and an end cap at one end of said shell;

an electric motor driving a shaft, said shaft to turn driving a compressor pump unit;

a remote end of said shaft extending through said motor to an end opposed to said compressor pump unit, said remote end of said shaft being secured in a bearing assembly, said bearing assembly being secured to said end cap of said housing in a bearing mount;

said bearing mount including oil supply passages for supplying a lubricant to a passage within said shaft, and a magnet mounted outwardly of said bearing mount and adjacent to said oil supply passages, said oil supply passages extending radially inwardly through said bearing mount at a first vertical location, and said magnet mounted beneath said first vertical location and surrounding said bearing mount, said bearing and said bearing mount formed as separate components; and said first bearing welded to said end cap at a location radially inwardly of said magnet.

* * * * *